April 30, 1935.   F. W. STOCKMEYER   2,000,002
CONTROL VALVE FOR GAS BURNERS
Filed June 30, 1932   2 Sheets-Sheet 1

April 30, 1935.    F. W. STOCKMEYER    2,000,002
CONTROL VALVE FOR GAS BURNERS
Filed June 30, 1932    2 Sheets-Sheet 2
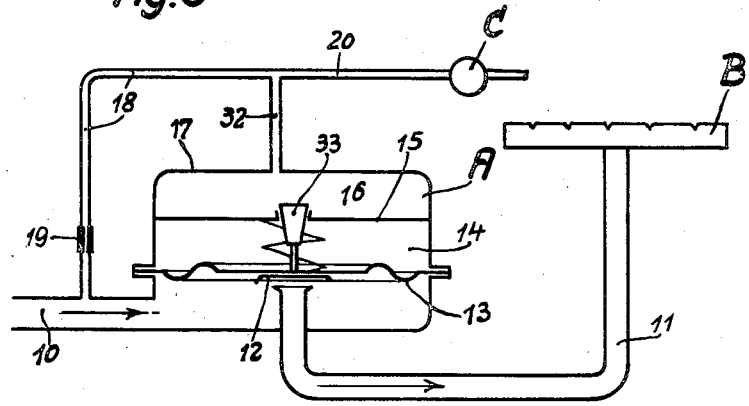
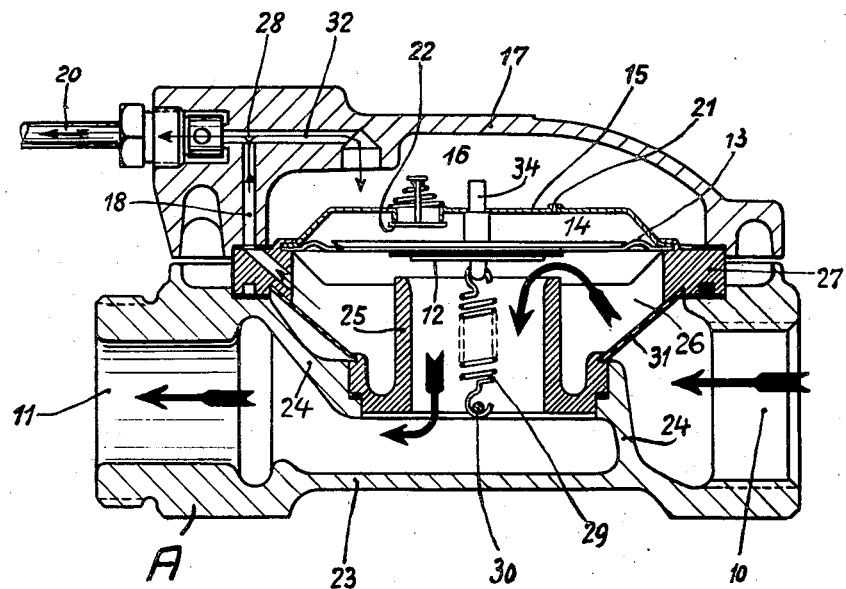

Patented Apr. 30, 1935

2,000,002

UNITED STATES PATENT OFFICE 2,000,002

CONTROL VALVE FOR GAS BURNERS

Friedrich Wilhelm Stockmeyer, Stuttgart, Germany, assignor to Robert Bosch Aktiengesellschaft, Stuttgart, Germany Application June 30, 1932, Serial No. 620,225
In Germany June 22, 1931

13 Claims. (Cl. 137—153)

The present invention relates to control valves for gas burners and the like controlled by alterations in pressure in a conduit branching from the main supply pipe.

Known arrangements of this kind have the drawback that the speed with which the controlling pressure alterations act on the diaphragm of the main valve is dependent on the proportion of the cross-section of the inlet part to the cross-section of the outlet part of the control conduit to a control chamber of the main valve. If it is desired to obtain a quick opening and a slow closing of the main valve, the inlet cross-section to the control chamber must be small, whilst the outlet cross-section must be relatively large. If, on the other hand, it is desired to obtain a quick closing and a slow opening of the main valve, the cross-section of the inlet must conversely be large in proportion to the cross-section of the outlet. In both cases the flow of the controlling current is retarded by the close throttling in the inlet or outlet. This is however a disadvantage if the controlling partial current is used for feeding further switch devices, for instance, a pilot or guardian flame in a gas burner.

The invention comprises an arrangement whereby the control current of gas is carried freely without substantial throttling through a chamber forming a part of the control conduit, and the devices serving for the influencing of the speed of response of the valve to the alterations in pressure in the control conduit (for example, valves opening only in one direction, throttles fixed or variable with the movement of the diaphragm and so forth) are arranged in paths branching from the controlling gas current to a control chamber. This arrangement permits the controlling current, unimpeded by throttles and so forth, to be led to the operating or safety devices to be supplied thereby, and yet to influence its action on the main valve in the desired manner.

Four examples of construction of the invention are illustrated in the drawings for three differing modes of use of the invention in controlling a main gas valve.

Figure 3 is a control diagram of a main gas valve for a gas burner for an arrangement having a variable throttle.

Figure 4 is a vertical section through a main valve and its associated control for quick closing and slow opening of the valve as in the case of Fig. 1 and showing certain structural details not shown in the diagrammatic views.

Figure 1:
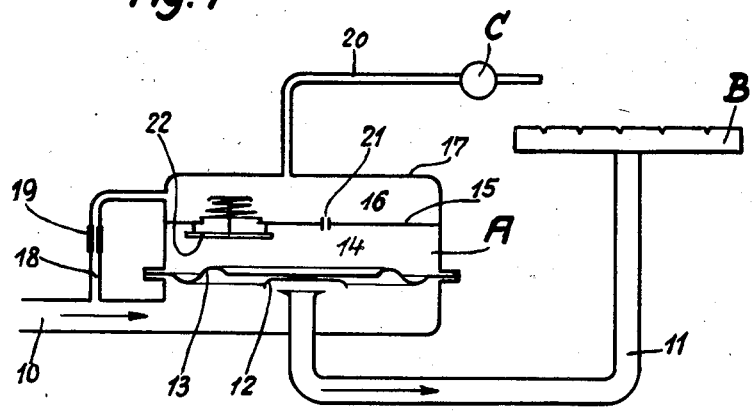
Figure 1 is a control diagram of a main gas valve for a gas burner for quick closing and slow opening.

In all the views A indicates generally the main gas valve, which is inserted between the main gas pipe 10 and the burner pipe 11 leading to the main burner B. The valve plate 12 of the main valve A is attached to a diaphragm 13, above which a control chamber 14 is arranged which is shut off by a partition wall 15. Between the partition wall 15 and the cover 17 of the main gas valve A is located an ante-chamber 16 through which the controlling current freely passes.

Figure 2:
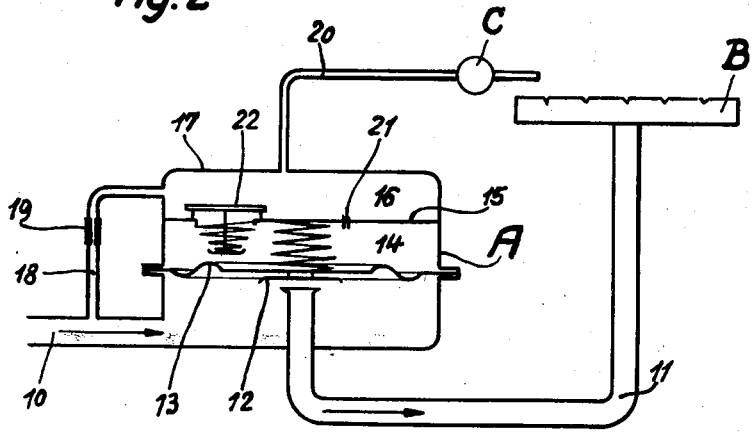
Figure 2 is a control diagram of a main gas valve for a gas burner for quick opening and slow closing.

In the diagrammatic views of Figs. 1 and 2, the supplying of the controlling current to the ante-chamber 16 takes place by a branch pipe 18, branching directly from the main pipe 10, in which branch pipe is arranged a throttle 19 which limits the amount of the controlling gas corresponding to the purpose of use. The outflow of the controlling gas from the ante-chamber 16 takes place by an outlet pipe 20, which is controlled by a switch C (e. g. a thermostatic safety-valve, a heat-regulator and the like). In the partition wall 15 is arranged a fixed throttle 21 and a non-return valve 22, both of which connect the ante-chamber 16 with the control chamber 14.

In Figure 1 the non-return valve 22 is so arranged that it only opens when an excess pressure prevails in the ante-chamber 16 relative to the control chamber 14. The mode of working is as follows:—When the switch C is opened, the same pressure prevails in both chambers 14 and 16, and this pressure is lower than the high pressure below the diaphragm 13. The main valve 12 is consequently raised, that is to say, opened. Under this condition of operation, as long the the switch C is open the controlling current flows unhindered from the inlet to the outlet of the ante-chamber 16 and the main valve 12 remains open. But as soon as the switch C is closed, the control gas accumulates and produces in the ante-chamber 16 an increased pressure which is at first separated by the partition wall 15 from the control chamber 14, but quickly penetrates through the throttle 21 and the non-return valve 22, which opens into the control chamber 14 and rapidly closes the main valve 12. If the switch C is opened again, the control current begins to flow immediately at full strength, whereby the pressure rapidly falls in the ante-chamber 16. On the other hand, the closing pressure in the control chamber 14 only slowly declines, because it can flow only into the chamber 16 through the narrow throttle 21, and not through the non-return valve, which closes in this direction. The main valve can thus only slowly open.

In Fig. 2, the valve 22 closes on excess of pressure in the ante-chamber 16 and opens only on excess of pressure in the control chamber 14. Therefore, the mode of working upon opening and closing of the switch shown in Figure 2 is exactly the the reverse of that in Fig. 1. If the switch C closes, the rising pressure can pass from the ante-chamber 16 only through the narrow throttle 21 into the control chamber 14, because the valve 22 is closed. The main valve 12 will thus only slowly close. Conversely, the closing pressure can flow on the opening of the switch C very rapidly from the control chamber 14 into the ante-chamber 16, because there is available for it in this direction not only the path through the throttle 21 but also the path through the valve 22. The valve will thus quickly open.

In the construction shown in Figure 3 a pipe 32 branches from the control pipe 18, 20 and leads into the ante-chamber 16. An opening is provided in the partition wall 15 between the ante-chamber 16 and the control chamber 14, in which opening a throttle body 33 moves up and down under the influence of the diaphragm 13 connected to it. By a suitable shape or formation the action of the throttle body 33 can be made variable. If, for example, the throttle body (as shown in the drawing) is thicker at its upper than at its lower end, it closes, when the diaphragm is in its lower position, the opening in the partition wall 15 more than when the diaphragm is raised. If thus when the main valve is open an increase of pressure occurs in the control pipe 18, 20, it is quickly propagated (because the throttle body is raised) through the wide cross-sectional opening into the control chamber 14, and the main valve 12 will quickly close. If, on the contrary, when the main valve is closed a fall in pressure occurs in the pipe 18, 20 by the opening of the switch C, the closing pressure prevailing in the control chamber 14 can only flow away slowly, because the throttle in its lower position only frees a small cross-section. The main valve will thus only slowly open.

The main valve shown in Figure 4 consists of a cup-shaped casing 23 and a cover 17. In the casing 23 a partition wall 24 is provided, in which is inserted the tubular valve-seat 25, which is connected by arms 26 with a ring 27 clamped between the cover 17 and the casing 23. In the ring 27 is flanged the diaphragm 13 carrying the valve plate 12, together with a hood 15, which corresponds to the partition wall 15 shown in Figures 1 and 2 and therefore is called the same. The partition wall 15 contains the throttle 21 and the non-return valve 22. The controlling gas current is taken from the high pressure chamber below the diaphragm through a pipe 18, which is connected through a pipe 32 with the ante-chamber 16 between the casing cover 17 and the hood 15. To the pipe 18 is connected at 28 the outlet pipe 20 in which the switch C is situated, so that the control pipe connection corresponds to the diagram represented in Figure 3.

For loading the valve 12 a spring 29 is provided which is secured to a cross-pin 30 connected to the valve-seat 25. 31 is a sieve fastened between the valve-seat 25 and the clamping ring 27. The combining of the valve-seat 25 with the clamping ring 27 of the diaphragm and the hood 15 to form a constructional unit, has the advantage that the diaphragm is fully protected and the whole controlling device is easily replaceable when damaged by an insertion ready for use. The workman entrusted with the putting of the device into order simply withdraws the damaged insert and puts in a new one. Preferably, the hood 15 is used for guiding the diaphragm 13 by a guide-pin 34 being carried through it. This guiding enables the main valve to be arranged in any position. Of course, it is not necessary that the controlling current be conducted through a chamber. The ante-chamber 16 could on the other hand be formed by a passage in the casing or cover, from which side passages branch off into the controlling chamber 14 in which the throttle 21 and the valve 22 are inserted.

I declare, that what I claim is:

1. A constructional unit for a control valve for gas burners and the like comprising a metal mounting ring, a diaphragm of less overall diameter than said metal ring and flanged into said metal ring along the inner edge face of said ring, a valve-plate secured to said diaphragm, a seat for the valve plate secured to said ring, and a hood flanged to said ring in spaced relationship to said diaphragm to enclose a space therebetween and having at least one restricted opening therein.

2. A control valve for gas burners and the like comprising a casing having a main gas passage therein, a diaphragm mounted in said casing, a main gas valve secured to said diaphragm, a partition wall, having a guideway therein, mounted in said casing in spaced relationship with said diaphragm to divide said casing into a controlling chamber and an ante-chamber, a guide pin on said diaphragm accommodated within the guideway in said partition wall, a substantially unrestricted conduit connecting the pressure side of the gas passage in said casing with said ante-chamber, means controlling the pressure in said conduit, and means mounted on said partition connecting said control chamber and said ante-chamber and controlling the speed of response of said diaphragm to the alterations in pressure in said conduit.

3. A control valve for gas burners and the like comprising a casing having a gas passage therein, a diaphragm mounted in said casing and exposed on one side to the gas pressure in said passage, a main gas valve in said casing operable to control the gas passage by alterations in pressure on said diaphragm, a partition wall in said casing having a constantly open but restricted throttle aperture therethrough mounted in spaced relation to said diaphragm to divide said casing into a controlling chamber and an ante-chamber on the side of said diaphragm opposite said gas passage with said diaphragm forming one wall of said controlling chamber, a conduit for a control current of gas connecting the pressure side of the gas passage in said casing with said ante-chamber, valve means to alter the pressure in said control conduit, and a non-return valve of larger area than said throttle aperture mounted in said partition wall to open by gas pressure in said ante-chamber in excess of gas pressure in said control chamber.

4. A diaphragm gas controller or switch comprising a casing having a main gas passage and means for controlling the flow of gas through said passage comprising a capsule seated in said casing, a diaphragm mounted in said capsule and a main gas valve carried by said diaphragm to open and close said passage, said capsule being formed with a valve seat for said valve, a filter and a diaphragm-clamping ring all arranged on one side of said diaphragm and a protecting cover arranged on the other side of said diaphragm, said casing and capsule being cooperatively formed and arranged for the removal from and replacement in said casing of said capsule with said diaphragm and valve as a separate structural unit whereby one such capsule with its contained diaphragm and valve carried thereby is interchangeable for another as a replacement of parts.

5. A diaphragm-and-valve unit for a gas controller of the type having a casing with gas inlet and gas outlet and diaphragm-operated valve for controlling the flow of gas from said inlet to said outlet, said unit comprising a clamping ring, a diaphragm having its peripheral edge portion secured to said ring and its central portion free to flex in opposite directions, a valve plate secured to one side of said diaphragm in said central portion thereof and an annular valve seat of less diameter than said clamping ring secured to said ring on the same side of said diaphragm as said valve plate.

6. A diaphragm-and-valve unit for a gas controller of the type having a casing with gas inlet and gas outlet and diaphragm-operated valve for controlling the flow of gas from said inlet to said outlet, said unit comprising a clamping ring, a diaphragm having its peripheral edge portion secured to said clamping ring and its central portion free to flex in opposite directions, an annular valve seat secured to said clamping ring and inwardly spaced therefrom, a valve plate secured to said diaphragm to close over said annular valve seat upon the flexure of said diaphragm in one direction and a filter extending between said valve seat and said clamping ring.

7. A constructional unit for a control valve for gas burners and the like comprising a metal ring, a diaphragm so flanged into said metal ring as to mount said diaphragm fixedly on said ring throughout the peripheral edge portion of said diaphragm and leave the central portion of said diaphragm free to flex in opposite directions, a valve plate secured to one side of said diaphragm in said central portion thereof, an annular valve seat of less diameter than said ring secured to said ring on the same side of said diaphragm as said valve plate, and a hood flanged to said ring in spaced relation with said diaphragm on the side thereof opposite said valve plate, said hood having a restricted throttle opening therein.

8. A gas controller comprising a casing having a main gas passage, valve means for controlling the flow of gas through said passage and control means for influencing the speed of operation of said valve means in valve opening and closing movements, said valve means comprising a capsule seated in said casing, a diaphragm mounted in said capsule and a main gas valve carried by said diaphragm to open and close said passage, said control means comprising a pressure-control chamber arranged in said capsule and provided with a non-return valve admitting gas thereto and a throttle orifice for the flow of gas into and from said chamber, and said casing and capsule being cooperatively formed and arranged for the removal from and replacement in said casing of said capsule with said diaphragm, main gas valve, control chamber and non-return valve assembled as a separate structural unit, whereby one such capsule with its contained diaphragm, main gas valve, control chamber and non-return valve is interchangeable for another as a replacement of parts.

9. A control valve for gas burners and the like comprising a casing having a main gas passage therein, a main gas valve for said passage, a diaphragm for operating said valve mounted in said casing and exposed on one side to the gas pressure in said main gas passage on the high pressure side of said valve, a control chamber in said casing on the side of said diaphragm opposite its first-mentioned side, said diaphragm forming one wall of said control chamber, a conduit for a control current of gas branching from the pressure side of said main gas passage, valve means for controllably varying the gas pressure in said conduit, and means comprising a pressure-operated valve connecting said control chamber and said conduit and automatically operating in response to differences in gas pressure between said control chamber and said conduit to cause passage of gas therebetween in opposite directions at such differing rates for the opposite directions of flow as to cause said diaphragm to produce a relatively rapid closing movement and a relatively slow opening movement of said main gas valve.

10. A control valve for gas burners and the like comprising a main gas conduit, a main gas valve for said conduit, a diaphragm for operating said main gas valve, casing means mounting said diaphragm and exposing one side thereof to the gas pressure in said main gas conduit on the high-pressure side of said main gas valve, said casing means being arranged to form a control chamber on the side of said diaphragm opposite its first-mentioned side with said diaphragm forming a flexible wall of said control chamber and an ante-chamber of constant cubic capacity with fixed and rigid boundary walls, means for supplying said ante-chamber with gas and for controllably varying the gas pressure therein comprising a branch conduit leading from said main gas conduit on the high-pressure side of said main gas valve directly into said ante-chamber and formed to constantly supply gas to said ante-chamber from said main gas conduit as long as the gas pressure in said ante-chamber is below that in said main gas conduit at the point of connection of said branch conduit therewith, an outlet control conduit leading directly from said ante-chamber to atmosphere for the flow of gas therethrough directly from said ante-chamber to atmosphere and a control valve in said outlet control conduit operative to control said flow of gas therethrough and thereby to controllably vary the gas pressure in said ante-chamber, fluid-passage means connecting said ante-chamber with said control chamber for the flow of gas between said chambers, and means comprising a pressure-operated member automatically operating in response to changes in gas pressure in said ante-chamber consequent upon operation of said control valve to vary the effective flow area of said passage means and thereby cause passage of gas from said ante-chamber to said control chamber and return flow of gas from said control chamber to said ante-chamber at such differing rates for the opposite directions of flow as to cause said diaphragm to effect the opening and closing movements of said main gas valve at speed differing for the two movements of said main gas valve.

11. A control valve for gas burners and the like comprising a main gas conduit, a main gas valve for said conduit, a diaphragm for operating said main gas valve, casing means mounting said diaphragm and exposing one side thereof to the gas pressure in said main gas conduit on the high-pressure side of said main gas valve, said casing means being arranged to form a control chamber on the side of said diaphragm opposite its first-mentioned side with said diaphragm forming a flexible wall of said control chamber and an antechamber of constant cubic capacity with fixed and rigid boundary walls spaced from said diaphragm on its said opposite side, means for supplying said antechamber with gas and for controllably varying the gas pressure therein comprising a branch conduit leading from said main gas conduit on the high-pressure side of said main gas valve directly into said antechamber and formed to constantly supply gas to said antechamber from said main gas conduit as long as the gas pressure in said antechamber is below that in said main gas conduit at the point of connection of said branch conduit therewith, an outlet-control conduit leading directly from said antechamber to atmosphere for the flow of gas therethrough directly from said antechamber to atmosphere and a control valve in said outlet control conduit operative to control said flow of gas therethrough and thereby to controllably vary the gas pressure in said antechamber, and means comprising pressure-operated valve means connecting said antechamber and said control chamber and automatically operating in response to changes in gas pressure in said antechamber consequent upon operation of said control valve to cause passage of gas from said antechamber to said control chamber and return flow of gas from said control chamber to said antechamber at such differing rates for the opposite directions of flow as to cause said diaphragm to effect the opening and closing movements of said main gas valve at speeds differing for the two movements of said main gas valve.

12. A control valve for gas burners and the like as defined in claim 11, and in which said means connecting said ante-chamber and control chamber comprises a constantly open fluid-passage connection between said chamber of relatively small cross-sectional area for the flow of gas therethrough and another fluid-passage connection between said chambers of larger cross-sectional area for the flow of gas therethrough, and said pressure-operated valve means comprises a non-return valve operatively mounted to control said larger fluid-passage connection and to open only by gas pressure in said ante-chamber in excess of gas pressure in said control chamber.

13. A control valve for gas burners and the like as defined in claim 11, and in which said means connecting said ante-chamber and control chamber comprises a constantly open fluid-passage connection between said chambers of relatively small cross-sectional area for the flow of gas therethrough and another fluid-passage connection between said chambers of larger cross-sectional area for the flow of gas therethrough, and said pressure-operated valve means comprises a non-return valve operatively mounted to control said larger fluid-passage connection and to open only by gas pressure in said control chamber in excess of gas pressure in said ante-chamber.

FRIEDRICH WILHELM STOCKMEYER.